W. H. HOOPER.
LIP TURNING MACHINE.
APPLICATION FILED DEC. 2, 1907. RENEWED APR. 14, 1909.
940,020.
Patented Nov. 16, 1909.
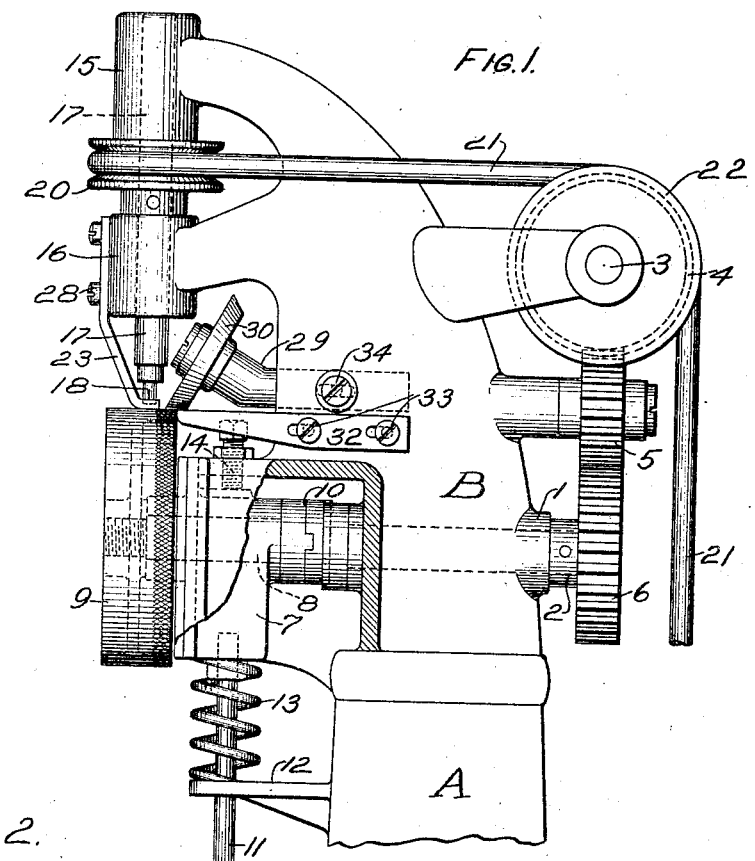
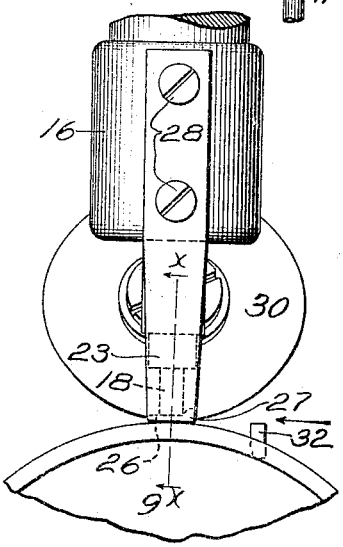
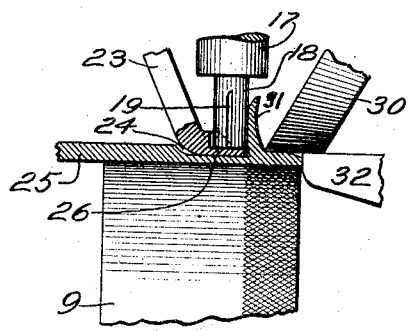
WITNESSES:
Roswell F. Hatch.
Redfield H. Allen
INVENTOR,
WILLIAM HENRY HOOPER,
BY Robt. P. Hains
ATTY.

UNITED STATES PATENT OFFICE.

WILLIAM H. HOOPER, OF LYNN, MASSACHUSETTS, ASSIGNOR, BY MESNE ASSIGNMENTS, TO THOMAS G. PLANT, OF BOSTON, MASSACHUSETTS.

LIP-TURNING MACHINE.

940,020. Specification of Letters Patent. Patented Nov. 16, 1909.

Application filed December 2, 1907, Serial No. 404,813. Renewed April 14, 1909. Serial No. 489,847.

*To all whom it may concern:*

Be it known that I, WILLIAM H. HOOPER, a citizen of the United States, residing at Lynn, in the county of Essex and State of Massachusetts, have invented an Improvement in Lip-Turning Machines, of which the following description, in connection with the accompanying drawings, is a specification, like characters on the drawings representing like parts.

In the manufacture of insoles for boots and shoes, it has been common heretofore to provide machines for turning up two lips, one being formed by slitting the insole from its edge inward and the other by slitting the sole diagonally from its flesh side outward or toward the edge. Such formation of double lip is possible in an insole which is relatively thick, but where the stock is thin or of low grade material a single lip only has been employed, such lip being usually formed by slitting the insole from its edge inward, all as well known by those skilled in the art. In turning the channel lip of such single lip structure, a tool has been employed acting against the lip in a direction from the edge toward the center of the sole. Since the stock is usually thin and of low grade, it has been found necessary in practice, heretofore, to reinforce the insole by means of canvas or the like cemented to the surface of the sole and covering both the inner and outer surfaces of the channel lip. Such application of the canvas to both surfaces of the channel lip is attended with much difficulty. The present invention, however, aims to overcome the necessity for covering both the inner and outer faces of the channel lip with a reinforcing material, its object being to provide a machine for turning a single channel lip upward and outward or toward the sole edge, and providing means in connection therewith for consolidating the material of the insole along the base of the channel lip, such consolidation of the material strengthening the sole outside and adjacent the base of the channel lip where the usual fastening means penetrates.

The objects and general purposes of the present invention will be better understood from the following description taken in connection with the accompanying drawings, which show one of the various forms or embodiments of the invention.

Figure 1 is a side elevation of a machine embodying the elements of the present invention, parts being broken away and only so much of the machine being shown as necessary to a correct understanding of the invention. Fig. 2 is a front elevation of the parts of the machine head which act directly upon the sole, the remaining elements being omitted as unnecessary. Fig. 3 is a sectional detail on the line $x$—$x$, Fig. 2, showing a somewhat exaggerated form of insole being treated.

The base A and head frame B may be of any usual or desired construction, the said head being provided with a suitable bearing 1, for a shaft 2, driven from the worm shaft 3 through a train of mechanism comprising a worm 4, and connecting gearing 5 and 6 of suitable character.

Mounted in a sliding frame 7 is a shaft 8, to which is suitably secured the feed wheel 9 preferably having a broad supporting face, as shown, the said shaft 8 being also operatively connected to the drive shaft 2 by suitable means, such as the "Oldham" clutch 10, which, while transmitting a positive drive to the shaft 8 and feed wheel 9, readily permits said shaft 8 and feed wheel 9 to be raised or lowered by means of the sliding frame 7, as will be clearly understood by those skilled in the art without detail description, the details of said clutch forming no part of the present invention.

Secured to the sliding frame 7 is a treadle rod 11, passing through a bracket 12, and between said bracket and the slide 7 said rod is surrounded by a coiled spring 13 normally acting to raise said slide against an adjustable stop 14 and bring the feed wheel into operative relation with the work and machine parts above.

In suitable bearings 15, 16, carried by the machine head B, is the tool shaft 17, carrying the single lip turning tool 18 preferably formed with flutes or corrugations 19, Fig. 3, said tool shaft having secured thereto a pulley 20 engaged by a belt 21, which, being driven from a suitable driving power and passing over pulleys 22 secured to the worm shaft 3, drives both the tool shaft 17 and the worm shaft 3. It is sometimes desirable, though not always necessary, to employ a channel guide 23 to extend into the channel 24 in the insole 25 and below the end of the lip turning tool 18, Fig. 3. When used, this guide 23 is preferably provided with a recessed portion 26 into which the lower end of the lip turning tool 18 extends, the end of said tool being protected by the lower flange of the guide, so that upward pressure of the feed wheel against the insole is taken up by the portion 26 of the guide and the material in the channel of the insole remains uninjured by rotary movement of the tool. At its forward edge, the guide 23 is preferably provided with a lip raiser, which as the sole is fed in the direction of the arrow, Fig. 2, first insinuates itself under the advancing lip and initially raises it for the action of the lip turning tool 18. The guide 23 is preferably secured by screws 28, 28 to the bearing 16 of the tool shaft and is bent as shown to place its end 26 beneath the end of the tool.

Adjustably mounted on the machine head frame B is an arm 29, the outer portion of which is upturned somewhat and carries an edge consolidating means, herein shown as the consolidating wheel 30. The peripheral portion of this consolidating wheel is constructed and arranged to bear upon the edge portion of the insole adjacent the base of the channel lip 31, Fig. 3, so that as the sole is fed through the machine and the single channel lip is turned upward and outward thereby tending to thicken the material at or adjacent the channel lip, the consolidating wheel 30 coacts to reduce the tendency to thicken at the part stated and to consolidate the material. This consolidation of the insole takes place substantially at the line where the fasteners are to pass and not only strengthens the material by such consolidation but reduces its thickness, tending to force the upper surface at the base of and outside the lip to the level of the surface of the reinforcing material when placed in the channel.

From the construction thus far described, it will be noted by those skilled in the art that by reason of the single lip turning tool 18 and its disposition in the channel of the lip which is formed by slitting the insole diagonally toward the edge, the outer edge portion of the insole adjacent the base of the lip may be acted upon by a consolidating device and the material strengthened by such consolidation which takes place simultaneously with the lip turning action, without cutting away the material of the insole at such part and while maintaining the skin surface.

It has been found that an insole having a channel lip formed by a diagonal incision toward the edge and acted upon by the lip turning tool and consolidating wheel 30, will feed readily and quickly through the path of its treatment owing to the rotary character of the elements acting upon it, but at sharp turns, as at the toe or instep, the rapid feed and change of direction of the sole is liable to cause it to swing too far so that the tool may leave the channel. To obviate this, a stop 32 is provided some distance beyond and at the feed or entrance side of the machine as indicated in Fig. 2. This stop, preferably, is mounted on the head B by means of the set screws 33, which pass through slots in the stop arm, by means of which it may be adjusted. Thus it will be clear that the lip turning tool 18 acts on the channel surface of the lip, turning the lip upward and toward the sole edge, and that the consolidating wheel 30 acts upon the sole at and adjacent the outer base portion of the channel lip, said tool and consolidating wheel being adjustable toward and from each other preferably by the set screw 34 acting on the shank of the arm 29 carrying the consolidating wheel 30. The tool 18 and consolidating wheel 30 having received the channel lip between them by first depressing the feed wheel 9, as will be obvious, maintains the lip in this position during the treatment of the entire lip, so that a guide device to act upon the sole edge may be dispensed with.

The action of the consolidating wheel 30 in no sense sets the lip 31, because it does not act as an anvil upon the outer surface of the lip, and consequently the lip-turning tool 18 can have no hammering action in setting the unsupported material of the lip; the said consolidating wheel acting as hereinbefore described to consolidate, strengthen, and depress the surface of the edge portion of the sole outside of and adjacent to the base of the channel lip, all as will be readily understood by those skilled in the art.

Obviously, changes may be made in the form, character, and relation of the parts within the scope of the invention, and characterizing features of which are set forth in the claims by the intentional use of generic terms and expressions inclusive of various modifications.

What I claim is:—

1. In a machine for turning a channel lip in a direction toward the edge of the sole, the combination of a feeding wheel, a rotary tool constructed and arranged to enter the channel of a shoe sole and turn the channel lip upward and in a direction toward the sole edge, consolidating means constructed and arranged to act upon the edge of the sole outside the channel lip and consolidate the material of the insole along the base of the channel lip and means for relatively adjusting the said rotary tool and consolidating means toward and from each other.

2. In a machine for turning a channel lip in a direction toward the edge of the sole, the combination of a lip turning tool constructed and arranged to enter the channel of the shoe sole and turn the channel lip upward and in a direction toward the sole edge, a consolidating wheel constructed and arranged to act upon the sole outside and adjacent the base of the channel lip and consolidate the material of the insole along said base and a feeding wheel having a supporting surface extending beneath both the lip turning tool and consolidating wheel and furnishing a bearing for the sole directly opposite thereto.

3. In a machine for turning a channel lip in a direction toward the edge of the sole, the combination of a feeding wheel, a rotary tool constructed and arranged to enter the channel of a shoe sole and turn the channel lip upward and in a direction toward the sole edge, a guide projecting into the channel and over the end of the lip turning tool, and consolidating means constructed and arranged to act upon the edge of the sole outside the channel lip and consolidate the material of the insole along the base of the channel.

4. In a lip turning machine, the combination of a tool shaft, a lip turning tool unyieldingly mounted with respect to said shaft for acting upon the channel face of the lip, constructed and arranged to turn said lip upward and toward the sole edge, consolidating means constructed and arranged to act upon the sole outside of the channel lip and adjacent the base thereof and consolidate the material of the sole along said base and a feeding wheel having a bearing surface opposite both the lip turning tool and consolidating means.

5. In a lip turning machine, the combination of feeding means, a lip turning tool for acting upon the channel face of the lip, constructed and arranged to turn said lip upward and toward the sole edge, consolidating means constructed and arranged to act upon the sole outside of the channel lip and adjacent the base thereof and consolidate the material of the sole along said base, and a stop arranged at the feed side and in advance of the lip turning tool.

6. In a lip turning machine, the combination of feeding means, a lip turning tool for acting upon the channel face of the lip, means for rotating said tool to cause the lip to be turned up and toward the sole edge, a consolidating wheel constructed and arranged to act upon the sole outside the channel lip and at the base thereof, and a stop disposed at the feed side of and in advance of the lip turning tool.

7. In a lip turning machine, the combination of a lip turning tool to act upon the channel face of the lip, constructed and arranged to turn said lip upward and toward the sole edge, a consolidating wheel to act upon the sole outside the channel lip adjacent the base thereof, a feeding wheel having a bearing surface opposite both the lip turning tool and consolidating wheel, and means for relatively adjusting the consolidating wheel and lip turning tool in a direction toward and from said feeding wheel in adapting the machine for the treatment, as specified, of different soles.

8. In a lip turning machine, a lip turning tool for acting upon the channel face of a lip formed upon the sole, means for actuating said lip turning tool to cause the lip to be turned up and toward the sole edge, feeding means to progress the sole past said lip turning tool, and a stop to limit the swinging movement of the sole as it changes direction under the action of the lip turning tool.

In testimony whereof, I have signed my name to this specification, in the presence of two subscribing witnesses.

WILLIAM H. HOOPER.

Witnesses:
T. A. TIRRELL,
WARREN G. OGDEN.